United States Patent

Wedler

[15] 3,635,384
[45] Jan. 18, 1972

[54] STOCK FEEDING DEVICE FOR AUTOMATIC SCREW MACHINES

[72] Inventor: John F. Wedler, 30749 Summit Ln., Pepper Pike, Ohio 44124

[22] Filed: Feb. 4, 1970

[21] Appl. No.: 8,557

[52] U.S. Cl..............................226/49, 226/127, 226/143, 226/165
[51] Int. Cl......................................................B65h 17/34
[58] Field of Search................226/162, 166, 165, 160, 127, 226/91, 49, 143

[56] References Cited

UNITED STATES PATENTS

| 166,166 | 7/1875 | Webster | 226/127 |
| 714,895 | 12/1902 | Hanson | 226/127 |
| 2,801,608 | 8/1957 | Peck | 226/127 |

Primary Examiner—Richard A. Schacher
Attorney—Bosworth, Sessions, Herrstrom & Cain

[57] ABSTRACT

A device for inserting bar stock into the spindle of an automatic lathe, such as an automatic screw machine. The device is mounted on the feed end of the machine and is provided with work-engaging jaws that are coaxial with the spindle of the machine. The jaws are manually operable to engage and clamp a bar and also are movable in directions parallel to the axis of the spindle so that a bar clamped in the jaws can be advanced into the spindle and into engagement with the feeding mechanism of the machine or withdrawn from the feeding mechanism of the machine.

11 Claims, 5 Drawing Figures

PATENTED JAN 18 1972 3,635,384

INVENTOR.
JOHN F. WEDLER
BY Bosworth, Sessions,
Herrstrom & Cain
ATTORNEYS

INVENTOR
JOHN F. WEDLER
BY Bosworth, Sessions, Herrstrom + Cain
ATTORNEYS

STOCK FEEDING DEVICE FOR AUTOMATIC SCREW MACHINES

BACKGROUND OF THE INVENTION

This invention relates to a stock feeding device for machine tools such as automatic screw machines and other automatic lathes and, more particularly, to a manually operated device for inserting a bar or other workpiece into the feeding mechanism of the spindle of an automatic screw machine. The device is described herein as applied to a single spindle automatic screw machine, but it is to be understood that it may be applied to and may be useful with other types of machine tools in which it is necessary to insert elongated workpieces into rotatable spindles.

In automatic screw machines of well-known types, the bar stock that is operated on by the machine is gripped firmly in the spindle by spring collet located in a sleeve at the extreme front of the spindle so that the stock is held securely at a point as close as possible to the tools. The collet does not move axially in the spindle and the bar is advanced as required by the operation of the machine by what is known as a "feeding finger" that resiliently engages the bar at all times and is advanced to feed the stock to engagement with a stock stop at the proper time. When a new bar of stock is inserted into the spindle, it must be pushed through the feeding finger so that thereafter the automatic operation can take place. Also, if a desired number of pieces has been manufactured without using the entire length of a bar, then the remaining end of the bar must be withdrawn from the feed finger against the resilient, frictional grip of the feeding finger.

Heretofore, the operations of inserting and withdrawing bar stock from the spindles of automatic screw machines of the type described have, so far as I am aware, been accomplished manually. Sometimes the operator can exert enough force on the bar with his hands to insert it into the feed finger. Other times the use of pliers is required and in some instances it is necessary for the operator to hammer the rear end of the bar to advance it into the feed finger. These operations are time consuming and can damage the stock. Similar difficulties are often encountered when it is desired to withdraw the unused portion of a bar from the machine.

It is, therefore, an object of the present invention to provide a device for feeding stock to or withdrawing stock from the spindles of automatic lathes that will eliminate the above noted difficulties. Other objects are the provision of such a device that can be operated readily; that can be used with the full ranges of sizes of stock that the machine is adapted to use; that can be adapted to a machine without involving any change in the mechanism or operation of the machine; that can be manufactured and installed on the machine at a reasonable cost and that is substantially foolproof in operation.

SUMMARY OF THE INVENTION

According to the present invention these and other objects and advantages are obtained by the provision of a manually operated device that is mounted adjacent the feed end of an automatic screw machine. The device is provided with clamping jaws that are actuated by a manually operated handle to engage the work and then are moved parallel to the axis of the stock, preferably by the same handle, to advance the stock into the spindle of the machine or withdraw it therefrom. According to a preferred form of the machine, a single handle is provided that may be moved in a rectangular orbit in one direction to advance the work step by step into the spindle and may be moved in a rectangular orbit in the opposite direction to withdraw the work from the spindle.

BRIEF DESCRIPTION OF THE DRAWINGS

Referring to the drawings in which a preferred embodiment of the invention is illustrated as used in conjunction with a well-known type of single spindle automatic screw machine.

DESCRIPTION OF THE PREFERRED EMBODIMENT

Figure 1:
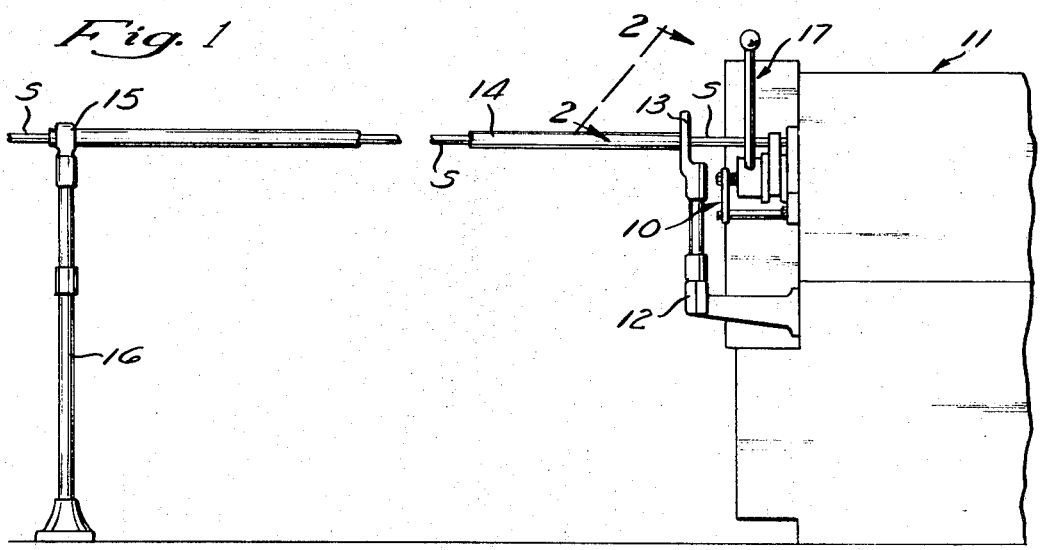
FIG. 1 is a side elevation illustrating the rear or feed end of an automatic screw machine having a device embodying the present invention associated therewith and illustrating a conventional support for the stock that is fed to the machine.

In FIG. 1 of the drawings, a device made according to the preferred form of the invention and indicated in general at 10 is shown as mounted for use on the feed or rear end of a single spindle automatic screw machine, a portion of which is shown in outline at 11. The machine has a conventional stock supporting bracket 12 that carries a stock pipe support 13. The front end of a stock pipe 14 is supported by the stock pipe support 13 while the rear end of the stock pipe is supported by a rear stock support 15 carried by a stock stand 16. These are conventional elements; the stock to be machined or worked on by the machine is shown herein at S as a bar of circular cross section. The stock S extends through the pipe 14 and through the feeding device 10 of the present invention into the spindle of the machine 11. As noted above, it is the function of the feeding device 10 to feed stock into the spindle of the machine or withdraw stock therefrom against the friction of the feeding finger and this is accomplished by the operator merely by manipulation of an actuating lever 17, all as will appear more fully below.

Figure 2:
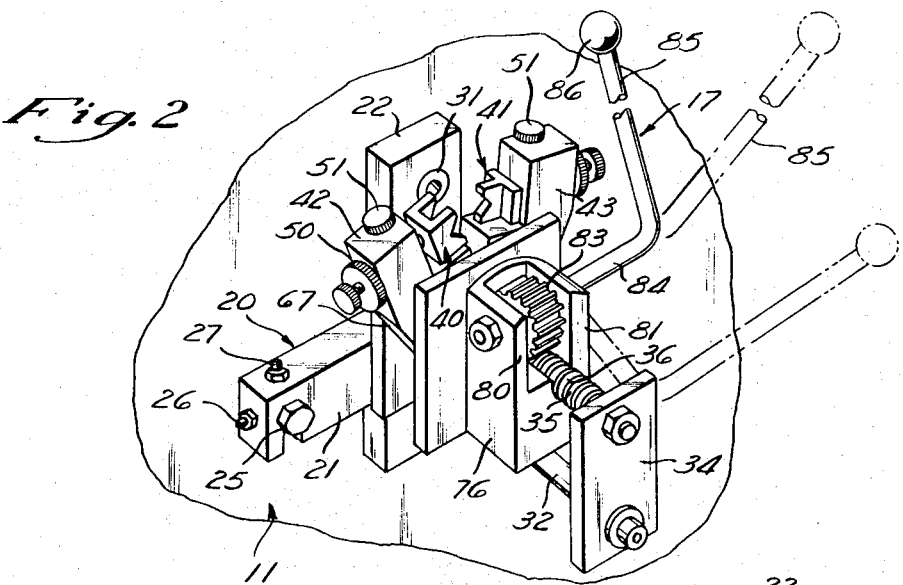
FIG. 2 is a perspective view of the feeding device of FIG. 1 to an enlarged scale, the view being taken from the rear of the machine on the side opposite the elevation of FIG. 1.
Figure 4:
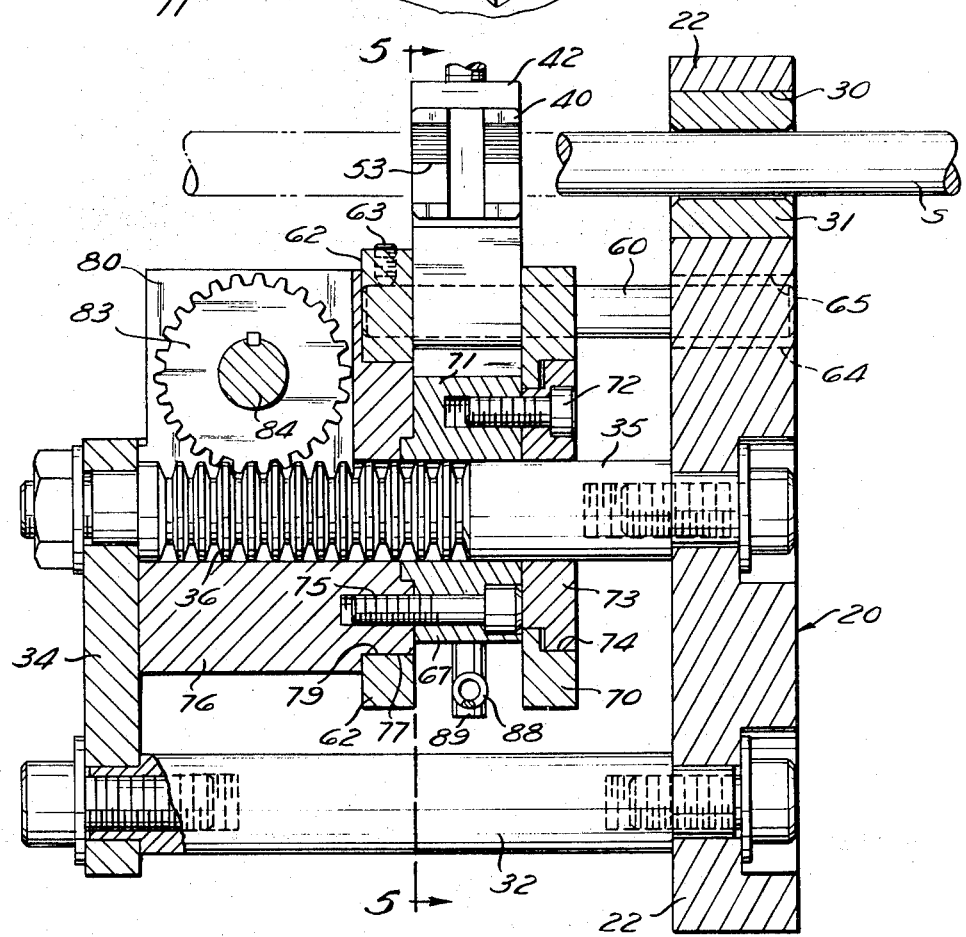
FIG. 4 is a vertical axial section taken as indicated by line 4—4 of FIG. 3.

In order to support the device upon the machine and also to constitute a supporting structure or base for the remaining components of the device, a mounting plate 20 having a horizontally extending portion 21 and a vertically extending portion 22 is provided. In the present embodiment of the invention the horizontally extending portion 21 of the mounting plate is provided with slots 23 and 24 near the opposite ends thereof that are spaced to engage capscrews, one of which is shown at 25 in FIG. 2, that are threaded into tapped openings in the rear housing of the machine 11. Setscrews 26 and 27 are threaded into tapped holes in the horizontal portion 21 so that the position of the device can be accurately located with respect to the machine. The setscrews are provided with lock nuts, as shown.

The mounting plate 20 supports the remainder of the device. The vertical portion 22 is provided at its upper end with an opening 30 to receive replaceable brass bushings 31 that are in axial alignment with the spindle of the machine when the device is properly mounted; these are employed to prevent whip of the stock as it is rotated during operation of the machine. The bushings are furnished in various sizes for various sizes of bar.

At its lower end the vertical portion 22 supports the front end of a horizontally extending rod 32 that is rigidly secured to the mounting plate in any convenient manner, such as that shown in the drawing. The rear end of rod 32 supports the lower portion of a vertically extending plate 34. In the zone of the intersection of the horizontal and vertical portions of the mounting plate, a horizontally extending circular rack bar 35 having circular rack teeth 36 thereon is supported. The front end of rack bar 35 is supported by the mounting plate 20 while the rear end is secured to the vertical plate 34, as shown. The rack bar 35 is thus rigidly supported on the mounting plate 20, and the rack bar, in turn, acts as a support for the remaining components of the device.

The work is clamped and advanced or withdrawn by work-engaging jaws 40 and 41. The jaws 40 and 41 are carried by jaw-supporting blocks 42 and 43, respectively. Jaw member 40 is U-shaped and it is supported by a shank 45 that extends into a bore 46 in jaw-supporting block 42. The position of the jaw 40 is adjustable by means of an adjusting screw 47 that is threaded into a bore 48 in the jaw-supporting block 42. The end of the screw 47 abuts the end of the shank 45 to limit inward movement of the shank in the bore 46, and thus support the jaw 40 against the forces exerted on it when a piece of bar stock is engaged by the jaws. The adjusting screw 47 may be locked in position by a knurled locking nut 50. A setscrew 51 that is engageable within the shank 45 is provided to prevent rotation of the jaw 40 in the jaw-supporting block 42.

The ends of the legs of the U-shaped jaw 40 have V-shaped recesses 53 therein for engagement with the bar stock S. The jaw 41 is T-shaped with its base having a V-shaped recess 55, the jaw 41 being adapted to enter between the legs of the U-shaped jaw 40. The jaw 41 is supported in the jaw-supporting block 43 in the same manner as the jaw 40 is supported in block 42. The same reference characters have been applied to corresponding parts of the two jaws and blocks and the description will not be repeated. It will be evident that by appropriate adjustment of the position of the jaws 40 and 41, they can be caused to engage bar stock of various sizes from the smallest on which the machine is adapted to operate to the largest. For example, in a small typical screw machine this range may be from one-eighth inch to one-half inch. Thus, when the size of the bar on which the machine is operating is changed, it is only necessary to make appropriate adjustments of the positions of the jaws 40 and 41.

In order to provide for movement of the jaws 40 and 41 toward each other into engagement with the bar stock and away from each other to disengage them from the bar stock, the jaw-supporting blocks 42 and 43 are pivoted on pins 60 and 61 that are secured in openings in an intermediate plate 62 as by setscrews 63. The forward ends of pins 60 and 61 are slideable in bushings 64 disposed in openings 65 in the mounting plate 20. Thus, the pins and the intermediate plate 62 are slideable axially in the direction of the rack bar 35 but are secured against rotation about the rack bar.

The depending leg portions 67 and 68 of the jaw-supporting blocks 42 and 43 are disposed between the intermediate plate 62 and a plate 70 that is also slideable on the rack bar 35 and through which the pins 60 and 61 extend.

In order to force apart the depending legs 67 and 68 of the jaw-supporting blocks 42 and 43 and thus urge the jaws 40 and 41 toward each other to clamp a bar between them, a cam 71 is disposed between the intermediate plate 62 and the plate 70. Cam 71 is secured by capscrews 72 to a collar 73 that surrounds and is slideable on rack bar 35. The collar 73 is also rotatable within a shouldered opening 74 of plate 70.

Cam 71 is also secured by capscrews 75 to a pinion-supporting block 76 that is slideably supported on the rack bar 35 and which has a cylindrical portion 77 of reduced diameter that is rotatable within a recess 79 in the intermediate plate 62. Thus, the pinion-supporting block 76, cam 71 and the collar 73 constitute a subassembly that is slideable on the rack bar 35 and rotatable with respect thereto. The jaws 40 and 41, jaw-supporting blocks 42 and 43, and the plates 62 and 70 also move axially with the pinion-supporting block 76 but are constrained against rotation about the rack bar 35 by the pins 60 and 61 which are guided in the bushings 64 supported by the mounting plate 20.

Thus, it will be evident that if the cam is rotated to cause the jaws 40 and 41 to grip bar stock disposed between them, the bar stock can be moved axially into the machine or withdrawn from the machine by axial movement of the jaws and associated mechanism toward and away from the machine while the bar stock is gripped by the jaws.

According to a preferred form of the present invention, this movement is accomplished through the pinion-supporting block 76 that is provided with upwardly extending, spaced bracket portions 80 and 81 between which a pinion 83 is disposed. Pinion 83 is keyed to a pinion-supporting portion 84 of the lever 17. Lever 17 is preferably bent at substantially right angles, as shown, and has a lever arm 85 that terminates in an actuating knob 86. The portion 84 of the lever 17 extends substantially horizontally, as shown, when the jaws 40 and 41 are retracted, and is rotatably supported in aligned openings in the upwardly extending bracket portions 80 and 81 of the pinion-supporting block 76. The pinion 83 meshes with the circular teeth 36 that are machined in the rack bar 35. Thus, rotation of the portion 84 of the actuating lever 17 will rotate the pinion and advance or retract the pinion block 76 and jaw-supporting blocks 42 and 43 toward or away from the machine. Bodily rotation of the pinion block 76, which is rigidly secured to the cam 71, in one direction about the circular rack bar will spread apart the legs 67 and 68 of the jaw-supporting blocks causing the jaws 40 and 41 to engage stock disposed between them, while rotation in the opposite direction will permit the jaws 40 and 41 to be moved away from the stock disposed between them by a retracting spring 88 that acts between pins 89 and 90 that are threaded into the lower ends of the leg portions 67 and 68 of the jaw-supporting blocks 42 and 43.

Figure 3:
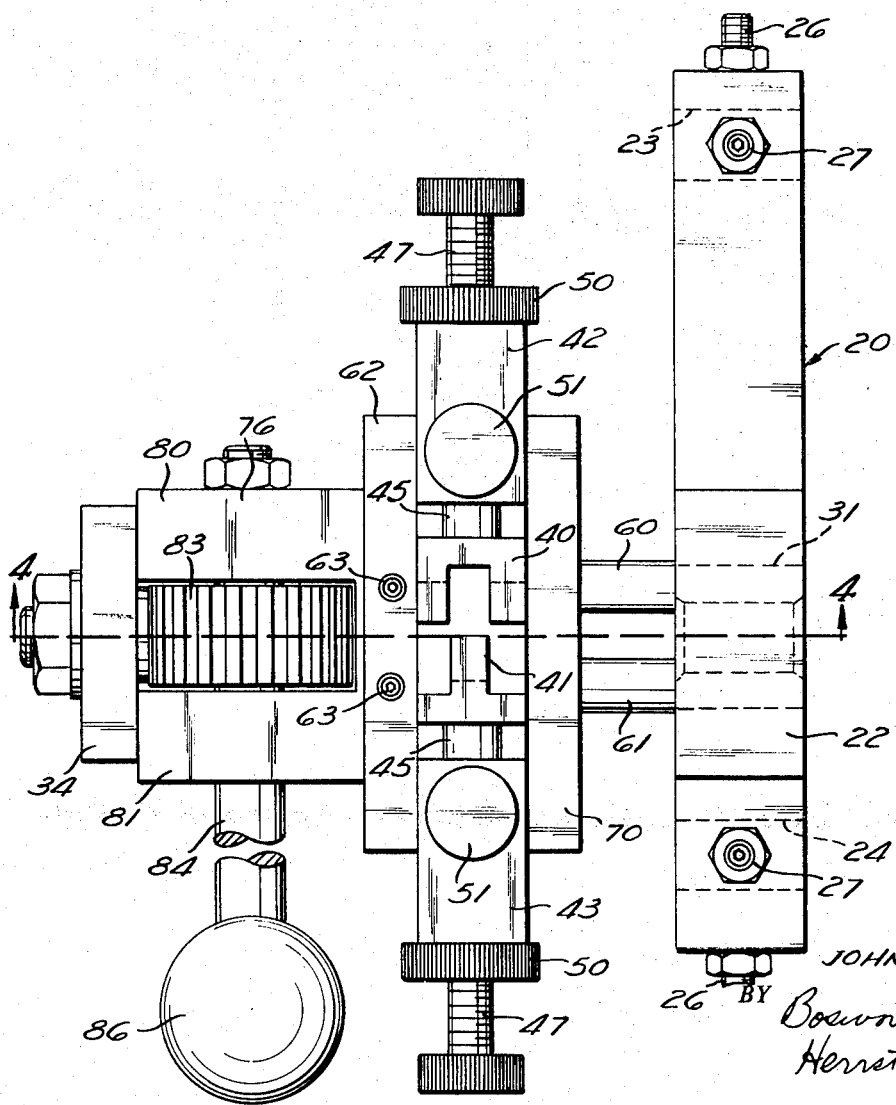
FIG. 3 is a top plan view of the device, to an enlarged scale.
Figure 5:
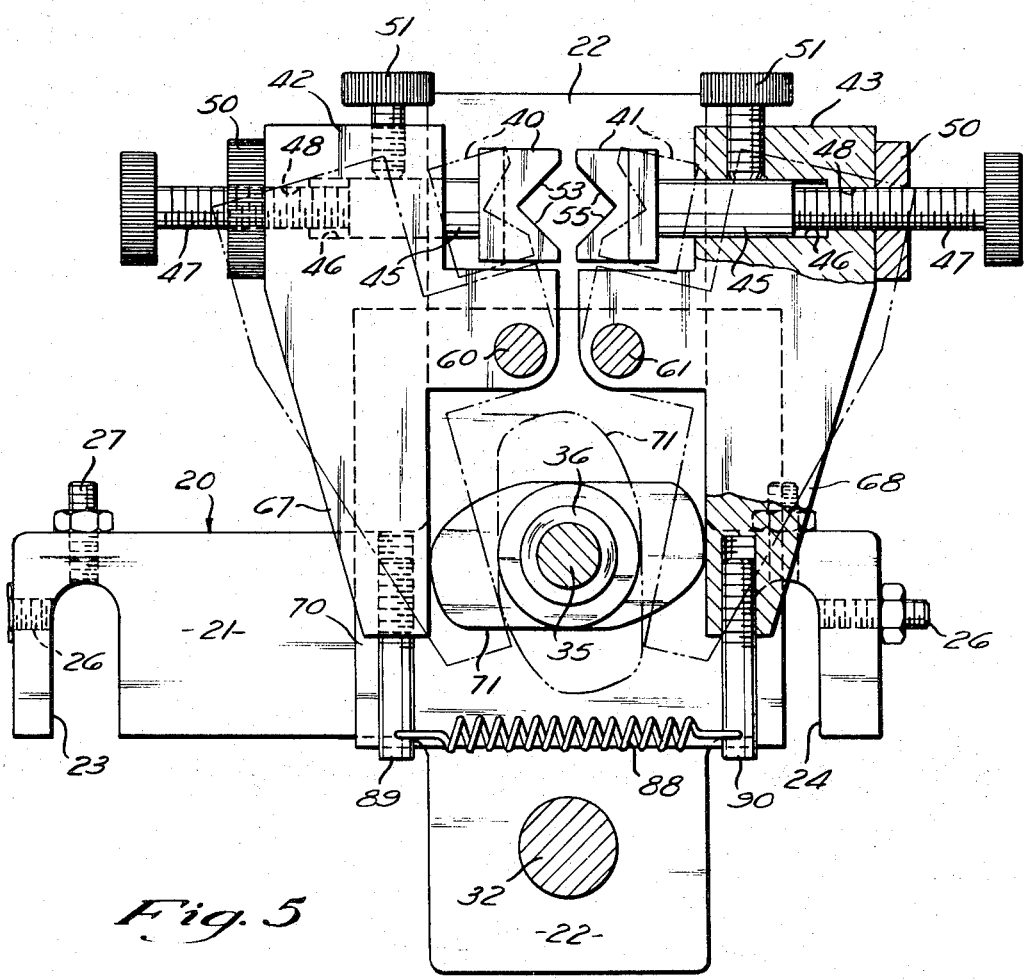
FIG. 5 is a transverse vertical section through the device taken along line 5—5 of FIG. 4.

The desired motions of the jaw members can be accomplished by manipulation of the lever 17 through the knob 86. In the embodiment shown in the drawings, movement of the knob 86 about the rack bar in a circumferential direction that is clockwise or downward in the perspective shown in FIG. 2, will rotate the cam 71 in a clockwise direction (FIG. 5) and cause the jaws 40 and 41 to move toward each other to grip the stock, the extreme gripping position of the jaws and cam being shown in full lines in FIG. 5. The force with which the stock is gripped is determined by the operator who has a substantial mechanical advantage because of the length of the lever arm 85. This force can be determined with little experience so that sufficient force can be applied to move the bar stock with respect to the machine either into it or to withdraw it from the machine without marring the surface of the bar stock. When the stock has been gripped, the knob 86 is moved in a circumferential direction about the axis of the pinion 83 and generally at right angles to gripping movement so that the portion 84 of the lever rotates the pinion 83. Clockwise rotation of the portion 84 and the pinion in the embodiment shown in the drawing results in advancing the bar into the spindle of the machine with which the stock inserting device is associated and counterclockwise rotation of the portion 84 results in withdrawal of the bar from the spindle of the machine. The circular teeth on the rack permit proper operation of the pinion at any position of the pinion and pinion-supporting block, these elements being in the position shown in FIGS. 2 and 3 when the jaws are retracted from the stock.

In operation, when a new piece of bar stock is to be inserted into the automatic screw machine or other machine tool 11, a bushing 31 of the proper size is inserted, the stock S is loaded into the pipe support, if one is employed, in the usual manner, the leading end of the stock is fed between the jaws 40 and 41 which are in their open position, through the bushing 31 and into the spindle of the machine as far as it can conveniently be fed by hand. If necessary, the positions of the jaws are adjusted. When the resistance of the feeding finger is felt, the knob 86 is rotated in a plane generally perpendicular to the axis of the stock by moving the knob as far as is required to cause the jaws to grip the stock with the desired force. This movement is from the full line position shown in FIG. 2 to a position approaching the lower dotted line position shown in FIG. 2, the amount of rotation of the pinion-supporting block 76 and the cam 71 required being determined by the amount of initial clearance between the jaws and the stock. After the stock has been properly gripped, the knob 86 is moved in a direction generally at right angles to its initial direction of movement to rotate the pinion 83 and advance the assembly of pinion, cam and associated parts along the rack bar 35 and thereby advance the stock into the machine. When the end of the advancing stroke is reached, the knob 86 is then manipulated to release the jaws from the bar stock and to move the jaw assembly and pinion assembly away from the machine 11, whereupon the initial operation can be repeated. This cycle can be repeated as many times as necessary to advance the bar stock step by step for the required distance into the machine, this being accomplished by movement of the handle 17 in a generally rectangular orbit that is counterclockwise in the example shown in the drawing.

If it is desired to withdraw a piece of bar stock from a machine, the same operations are employed but the pinion, cam and gripping jaws are advanced toward the machine before the jaws are caused to grip the bar stock and then the assembly is moved away from the machine by rotation of the pinion by means of the lever 17 and knob 86. In the embodiment shown in the drawing, stock can be withdrawn from the spindle of the machine by orbital movement of the knob 86 in a clockwise direction.

It will be evident that with this simple apparatus, which can be mounted adjacent the feed end of an automatic screw machine or similar machine, stock can be readily and rapidly fed into the machine with a minimum of effort on the part of the operator and with a minimum of delay. Similarly, unused portions of a bar of stock can be withdrawn from the machine. The operator has sufficient mechanical advantage both in the operation of gripping the stock with the jaws 40 and 41 and in the operation of advancing or retracting the stock so that these operations can be carried out readily without requiring the application of undue force or effort on the part of the operator, which makes it possible for the operator accurately to control the advancement of the bar stock into the machine without damaging the stock. The single operating handle is highly advantageous since the operator can operate the device with one hand and maintain the desired gripping engagement of the jaws with the stock during advancing or retracting movements of the stock and can quickly disengage the jaws from the work by a small movement of the handle and engage them again when it is desired to advance or withdraw the stock another step.

The entire device is simple, can be adapted to existing machine tools with a minimum of effort and is essentially foolproof in operation. The only adjustment necessary to adapt the device to different sizes of stock is to put in the proper size of bushing 31 in the opening 30 and to adjust the positions of the jaws 40 and 41 by means of the screws 47 so that they will properly grip the bar stock with a minimum of movement between the engaged and released positions. After the stock has been fed into the machine and is engaged by the feeding finger, the jaws are simply retracted as far as they will go and the machine tool then can be operated in its normal manner.

I claim:

1. A device for feeding elongated stock into a machine tool having a rotatable spindle, comprising stock engaging jaws movably supported adjacent said machine tool, manually operable means for moving the jaws into clamping engagement with the stock and manually operable means for moving the jaws in both feeding and withdrawing directions parallel to the axis of the stock while said jaws are in clamping engagement with the stock, whereby stock can be fed into the machine and withdrawn from the machine, said device having a single actuating handle for operating said means for moving the jaws into clamping engagement with the stock and said means for moving said jaws in directions parallel to the axis of the stock.

2. A device according to claim 1 in which the actuating handle is moved in one direction to cause the jaws to clamp the stock and in the opposite direction to cause the jaws to release the stock, and in directions generally at right angles to the first directions to move the jaws in directions parallel to the axis of the stock whereby the stock can be advanced into the machine tool by moving the actuating handle in an orbital path in one direction and may be withdrawn from the machine tool by moving the actuating handle in an orbital path in the opposite direction.

3. A device according to claim 2 in which the orbital path is generally rectangular.

4. A device according to claim 1 having a supporting structure adapted to be mounted on the machine tool, jaw-supporting blocks pivotally mounted in said supporting structure for carrying said work-engaging jaws and wherein the means for moving the jaws into clamping engagement comprises a cam operatively connected to said actuating handle and engageable with said jaw-supporting blocks.

5. A device according to claim 4 having a circular rack bar fixed to said supporting structure and extending generally parallel to the axis of the stock, a pinion-supporting block slideably and rotatably carried by said circular rack bar, a pinion mounted in said pinion-supporting block and in engagement with said rack bar whereby rotation of said pinion about its axis causes said pinion-supporting block to be moved in axial directions along said rack bar, the supports for said jaw-supporting blocks being axially movable with said pinion-supporting block whereby rotation of said pinion about its axis will move said jaw-supporting blocks in directions parallel to the axis of said bar.

6. A device according to claim 5 wherein said cam for actuating said jaw-supporting blocks is fixed to said pinion-supporting block whereby rotation of the pinion-supporting block about the axis of the circular rack will rotate the cam with respect to the jaw-supporting blocks, said actuating handle being adapted to rotate said pinion about its own axis and to rotate said pinion-supporting block about the axis of said circular rack.

7. An apparatus according to claim 6 wherein said actuating handle comprises a lever having a pinion-supporting portion journaled for rotation in said pinion-supporting block and said pinion being fixed to said pinion portion, said lever having another portion extending at an angle to said pinion-supporting portion and constituting a lever arm for rotating said pinion-supporting portion.

8. A device according to claim 1 wherein one of said jaws is U-shaped, the legs of the U being provided with stock engaging portions, and the other jaw is T-shaped and is provided with a stock-engaging portion which is adapted to extend between the legs of said U-shaped jaw member.

9. A device for feeding stock into an automatic lathe comprising a mounting plate adapted to be secured to said lathe, a support plate spaced from but attached to said mounting plate, a rack bar extending between said plates, a pinion-supporting block slideably and rotatably carried by said rack bar, a pinion engaging said rack bar and carried by said pinion-supporting block, a pair of stock engaging jaws on opposite sides of said rack bar, jaw-supporting blocks carrying said stock engaging jaws, said blocks being pivotable to bring said jaws into and out of engagement with said stock, a cam rotatable between said blocks to pivot said blocks, said cam being carried by said pinion-supporting block, a handle affixed to said pinion to rotate the pinion about its axis to move said stock engaging jaws axially with respect to the axis of said stock and to rotate said pinion block about the axis of said rack bar to rotate said cam and to move said jaws into or out of engagement with said stock.

10. A device for feeding stock into an automatic lathe comprising a mounting plate adapted to be rigidly secured to said lathe, a support plate spaced from but attached to said mounting plate, a circular rack bar extending between said plates, a pinion-supporting block movably slideably carried by said rack bar, a pinion engaging said rack bar and carried by said pinion block, an actuating handle secured to said pinion to rotate said pinion and pinion block about said rack bar and to move said pinion and pinion block axially with respect to said rack bar, a pair of stock engaging jaws, jaw-supporting blocks carrying said stock engaging jaws, a plate member adjacent said pinion-supporting block and said jaw-supporting blocks, each of said blocks being pivotable about a pin fixed to said mounting plate extending from said mounting plate to said plate member, said blocks being located between said pinion block and said mounting plate, and a cam affixed to said pinion block and extending through an opening in said plate member and engaging said jaw-supporting blocks, whereby rotation of said cam in one direction pivots said jaw-supporting blocks to bring said stock engaging jaws into engagement with said stock and rotation of said cam in the opposite direction permits said jaw-supporting blocks to pivot in the opposite direction to disengage said jaws from said stock.

11. Apparatus for feeding stock into an automatic screw machine according to claim 10 wherein said stock engaging jaws are supported on one end of said jaw-supporting blocks, there being a spring acting upon the opposite ends of said jaw-supporting blocks, said spring tending to pivot said jaw-supporting blocks in directions to disengage said jaws from said stock.

* * * * *